Sept. 30, 1941. C. E. MEYERHOEFER Re. 21,913

HEATER

Original Filed May 7, 1937 4 Sheets-Sheet 1

INVENTOR.
Carl E. Meyerhoefer

BY Duell, Mauro and Smith

ATTORNEYS

Sept. 30, 1941. C. E. MEYERHOEFER Re. 21,913

HEATER

Original Filed May 7, 1937 4 Sheets-Sheet 2

INVENTOR.
Carl E. Meyerhoefer
BY Duell, Mauro and Smoot
ATTORNEYS

Sept. 30, 1941. C. E. MEYERHOEFER Re. 21,913
HEATER
Original Filed May 7, 1937 4 Sheets-Sheet 3
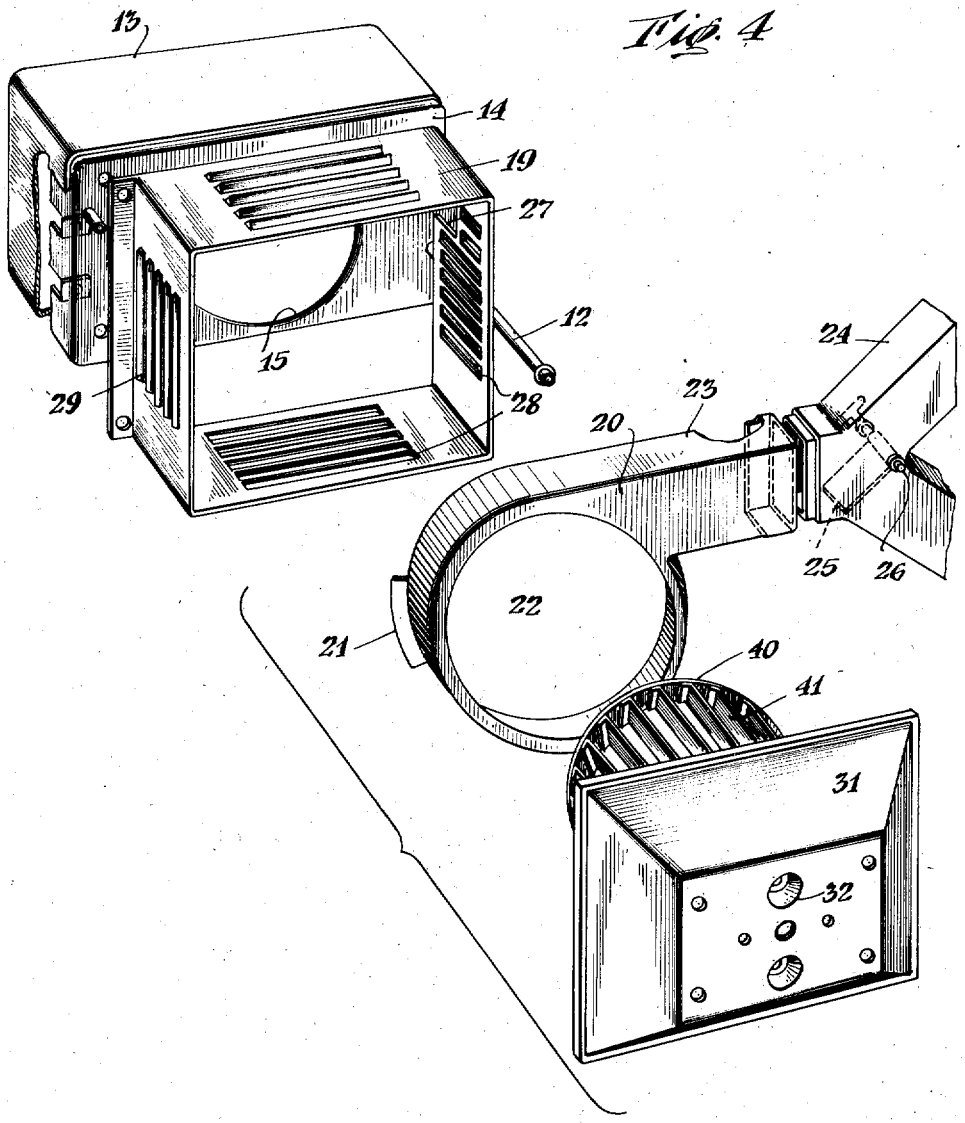
INVENTOR.
Carl E. Meyerhoefer
BY Duell, Rance and Smoot
ATTORNEYS Sept. 30, 1941. C. E. MEYERHOEFER Re. 21,913

HEATER

Original Filed May 7, 1937 4 Sheets-Sheet 4

INVENTOR.
Carl E. Meyerhoefer
BY Duell, Rance and Smoot
ATTORNEYS

Reissued Sept. 30, 1941

Re. 21,913

UNITED STATES PATENT OFFICE 21,913

HEATER

Carl E. Meyerhoefer, Brooklyn, N. Y., assignor to E. A. Laboratories, Inc., Brooklyn, N. Y., a corporation of New York Original No. 2,087,160, dated July 13, 1937, Serial No. 141,273, May 7, 1937. Application for reissue July 19, 1941, Serial No. 403,240

16 Claims. (Cl. 257—137)

This invention relates to a structurally and functionally improved heater, capable of use in numerous different associations, but ideally adapted for employment in connection with vehicles, and especially within the bodies of vehicles driven by internal combustion motors or similar sources of power and in the circuit of which it may be connected.

It is an object of the invention to furnish a unit of this character and by means of which an extremely efficient heat exchange occurs. Accordingly, with only minimum losses, a maximum body of air will have its temperature raised within a very short interval of time.

A further object of the invention is that of providing a heater and by means of which air may be efficiently distributed in a novel manner, such distribution—at the will of the operator—occurring in any desired direction.

Another object of the invention is that of constructing a heater which will not alone serve to efficiently warm a pre-determined space, but which will also incorporate a structure such that proper volumes of air may be intensely and locally distributed. Accordingly, and for example, the heater, while serving to properly condition air within the interior of a vehicle or otherwise, may also distribute, in concentrated form, a blast of air to the surface of the windshield or to an air deflector in a portion of the vehicle or room relatively remote from the heater body.

Still another object is that of constructing a unit of this character and which, consistent with the achievement of the foregoing, will occupy only a very small amount of space. Accordingly, it may be conveniently mounted against practically any proper supporting wall and without interfering with the desired use of the enclosure within which it is disposed.

An additional object is that of furnishing a heater embodying relatively few parts, each individually simple and rugged in construction and which, when assembled, will operate over long periods of time with freedom from all difficulties.

With these and other objects in mind, reference is had to the attached sheets of drawings illustrating practical embodiments of the invention, and in which:

Fig. 4 is a perspective view of the main units of the heater and showing the same in disassembled condition;

Figure 1:
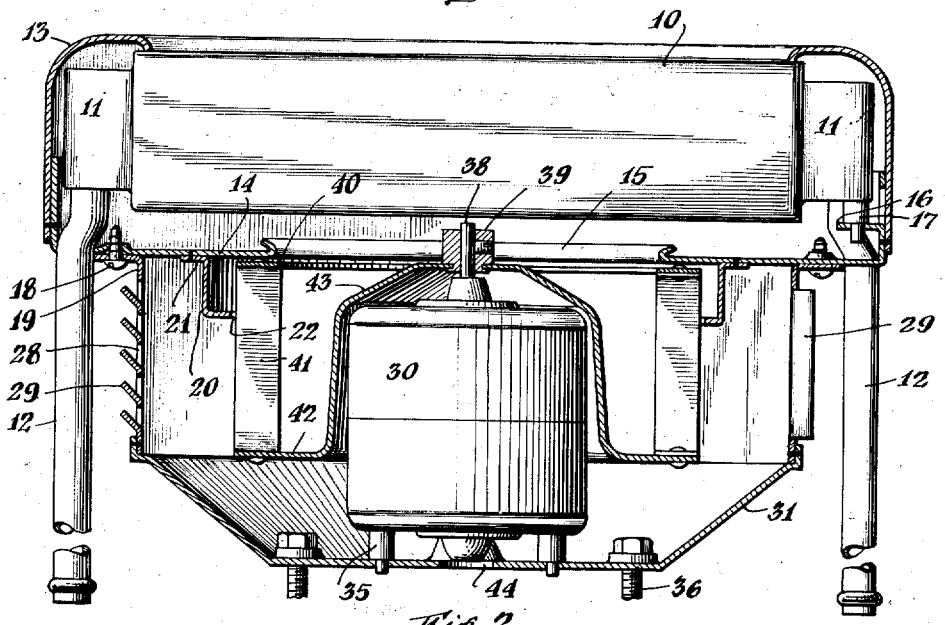
Fig. 1 is a sectional plan view of a heater taken along the line 1—1 and in the direction of the arrows as indicated in Fig. 2 with the pipe, core and motor casing not sectioned.
Figure 2:
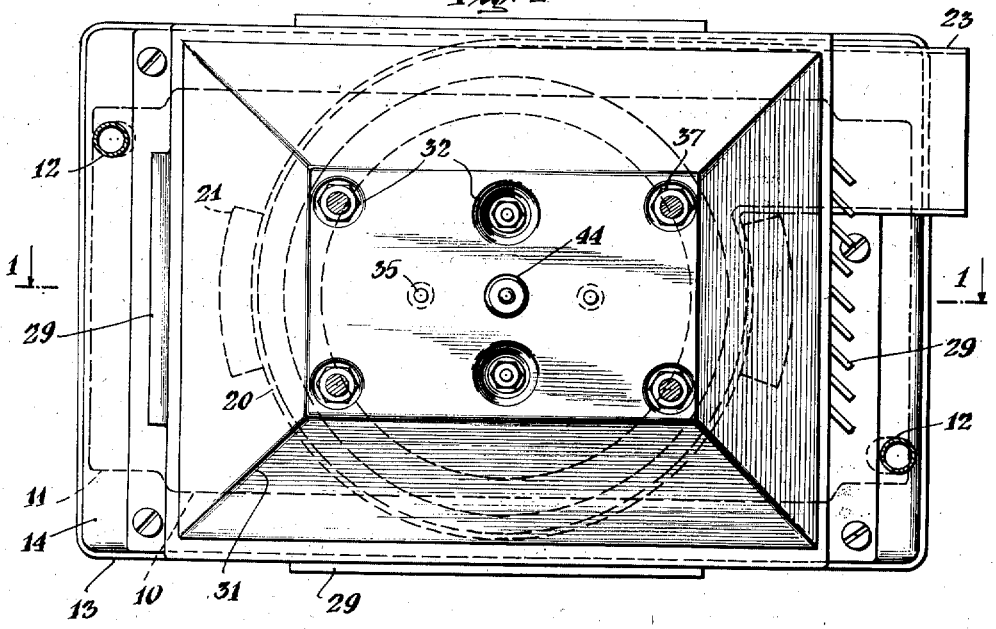
Fig. 2 is a rear view thereof.
Figure 3:
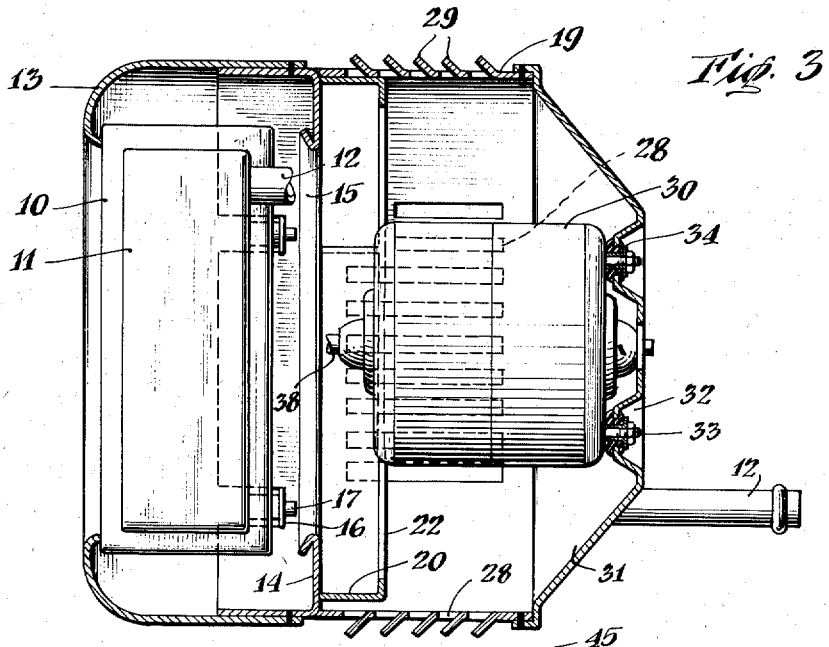
Figs. 3 is a transverse sectional view taken along the lines 3—3 and in the direction of the arrows as indicated in Fig. 2.

Referring primarily to Figs. 1, 2 and 3, it will be noted that the numeral 10 indicates a heat transfer unit such as a core and which is provided with header portions 11 extending from its opposite side edges. These portions are connected to tubes 12, one being associated with the lower portion of one header, while the other is associated with the upper portion of the second header. In this manner a thermally-induced flow through the core is assured and the heater may be turned through 90° without such turning interfering with this action. The core may, of course, include any desired construction, such as a conventional cellular structure, tubes and heat transfer strips, or otherwise.

The core is enclosed within a casing 13 which may be formed of any desired material and have any acceptable finish. This casing presents an open face in line with the core body and a shroud plate 14 may be fixed to its rear edge and secured against movement in any desired manner. The shroud plate is formed with an opening in line with the center portion of the unit 10, and this opening may be defined by a forwardly inclined flange 15. At this time it is also to be noted that plate 14 may present any desired number of inwardly extending portions 16, cooperating with bumpers 17 secured to the heat transfer structure or core. These bumpers are preferably of rubber, or similar material, and thus provide a resilient mounting in addition to allowing for expansion and contraction of the core without consequent rattling or straining of the parts.

Now referring additionally to Fig. 4, it will be noted that plate 14 mounts—as for example by screws or bolts 18—a housing 19. A secondary casing 20 is disposed within housing 19 and may have external flange portions 21 by means of which it may be secured—through spot-welding or otherwise—to the face of plate 14. This casing 20 is annular and has its side face formed with an opening 22. A duct 23 also forms part of casing 20 and extends tangentially therefrom in line with such opening. The outer end of this duct may, for example, be connected to a conduit member 24 through which air may be distributed upwardly and/or downwardly according to the position of a valve 25 conveniently controlled by a shaft 26. Before concluding consideration of housing 19, it will be observed that the latter is formed with an opening 27, through which duct 23 may extend outwardly, and this housing is also formed with a series of openings 28, adjacent the outer edges of which louvers or deflector panels 29 may be disposed, to direct any air discharge through the upper or lower openings outwardly and rearwardly in the direction of the core. In this connection, it will be understood that the heater will generally be mounted with its front side facing the rear of a vehicle. In any case, the openings 28 and the louvers 29 will be disposed in a manner to direct the air discharge in such direction, with respect to the heater portion as may be useful or desirable. As shown, air discharged through one of the sets of side openings may be similarly directed but the deflectors or louvers associated with the opposite set of openings conveniently deflect the air downwardly. This is because the heater, as viewed in Fig. 4, is intended for application to the dash of a vehicle and to the right of the driver's position. In most instances it would be preferred to have the discharged air under these circumstances directed in the manner afore indicated.

Now with a view to circulating air through the heater, it will be observed that a motor driven impeller is employed. The motor includes a casing 30 which may be mounted upon a plate 31, the face of which may be recessed as at 32 to accommodate a central pair of bolts 33 mounted in grommets 34 of rubber or similar material and supporting the motor casing. As indicated particularly in Figs. 1 and 2, there may extend from the motor casing and at points intermediate the grommets 34 a pair of rubber studs 35 which bear against the inner face of plate 31. In this manner the motor is mounted against shocks and motor noises will not be transmitted to any considerable degree to the heater structure. Heater mounting bolts 36 extend through openings in the corner recesses or countersunk portions 32 and have their bodies secured against movement by nuts 37. In this manner, it is feasible to drill the dash of a vehicle or any other wall so that bolts 36 may be passed through the same and these bolts at points beyond the wall may have lockwashers and nuts applied to them to secure the heater against displacement.

The inner end of the motor shaft 38 extends into the opening defined by flange 15, and at this point has secured to it a hub 39. A blower wheel including an outer ring 40, an annular series of blades 41 and a rear plate 42 is coupled to hub 39 by having this rear plate extend forwardly and inwardly as indicated at 43. The space defined by the inner edges of blades 41 may be substantially equivalent to that of the opening in shroud plate 14. The diameter of opening 22 in secondary plate 20 is sufficient to properly accommodate this blower-wheel, it being apparent that when the parts are positioned as in Fig. 1, portions of the wheel extend into the secondary casing 20, but for example, the major portion of the wheel extends between the rear edge of casing 20 and the corresponding edge of housing 19.

As afore brought out, secondary casing 20 is preferably attached to plate 14 by spot-welding. This plate is also attached conveniently to casing 13 by welding, and the same is true of plate 31 and housing 19. Thus, the heater is assembled in two major units. One of the these comprises core 10, casing 13, plate 14 and casing 20, while the second of the same conveniently includes plate 31 and housing 19. Motor 30 is, of course, associated with plate 31, and the blower-wheel is attached to the motor shaft, and housing 19 is secured to shroud plate 14. However, under these circumstances, all parts may be tested with facility, and after the test has been successfully concluded, all that remains for the operator to do is to employ securing elements 18, or their equivalents, to join the two major portions. It is obvious that, if desired, the motor mounting plate 31 may be formed with an opening 44 through which the motor bearing may be lubricated.

In use, a suitable supporting surface is provided with openings for the accommodation of tubes 12 and bolts 36. Thereafter, the latter are clamped against movement and the tubes are connected to a suitable source of heated fluid, as, for example, the cooling system of an internal combustion motor. Motor 30 being connected to a source of suitable current supply (not shown), it follows that shaft 38 will revolve, thereby driving the blower-wheel. It may be mentioned in passing that the control to the motor, in accordance with conventional practice, preferably includes a variable resistance or other suitable control so that the speed of drive of the motor may be varied as desired. However, in any event, it is obvious that air will be drawn through the core 10 and opening defined by flange 15 and discharged through secondary casing 20 as well as housing 19. The air in moving in contact with core 10 will obviously have its temperature raised so that the air discharged by the blower-wheel will be in proper condition. Air flowing through duct 23 will be distributed by the conduit member 24, for example, to the windshield and/or rear compartment of the vehicle. The remainder of the air will seek to flow through openings 28.

Figure 5:
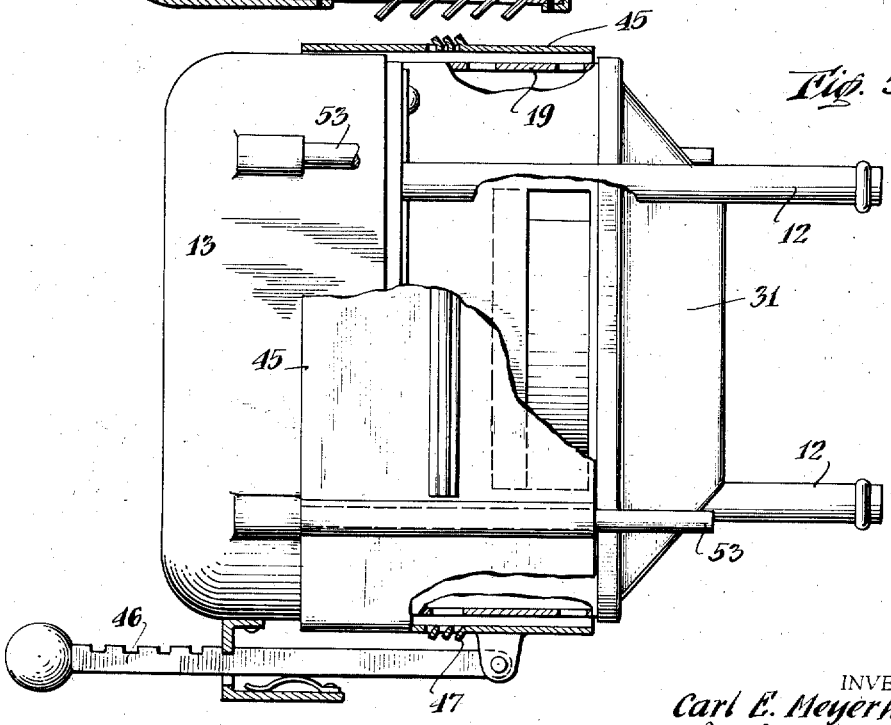
Fig. 5 is a partly sectional side view of the heater.
Figure 6:
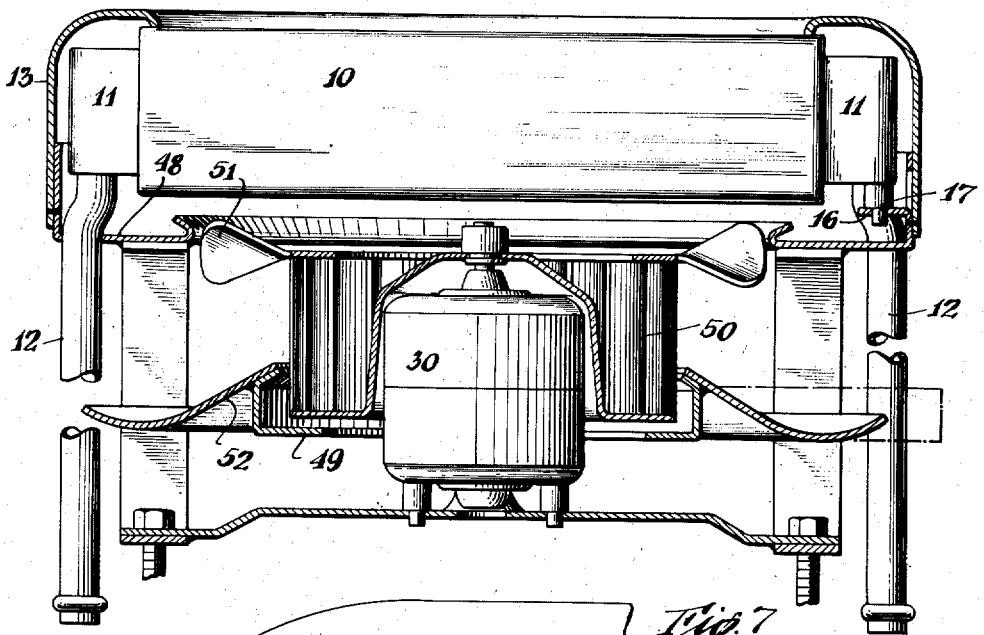
Fig. 6 is a view similar to Fig. 1, but showing a slightly different form of construction.
Figure 7:
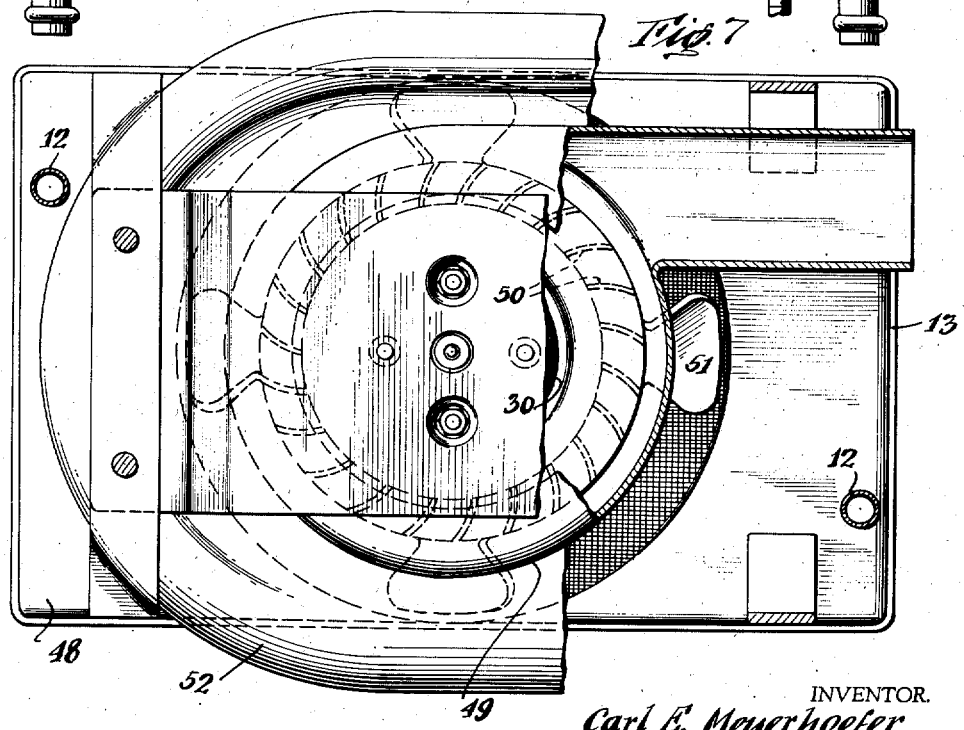
Fig. 7 is a rear elevation of the apparatus as shown in Fig. 6, and with certain of the parts broken away to disclose underlying construction.

These openings may be uncontrolled if desired, in which case such flow will be unimpeded. If control is desired however, this may be secured by, for example, the structure especially shown in Fig. 5. In this view it will be observed that a sleeve 45 is slidably mounted on guides and encloses housing 19. This sleeve has a configuration allowing advance and retraction of its body over casing 13, and motor mounting plate 31 with as small a clearance as is practicable. An actuator 46 may serve to shift this sleeve forwardly and rearwardly. With a form of construction such as this, the louvers 29 are dispensed with in so far as housing 19 is concerned. They may however, be conveniently disposed adjacent openings formed in sleeve 45; such louvers having been indicated by the numeral 47. The sleeve openings in adjacent faces of the sleeve are so arranged with reference to the openings formed in housing 19 that it is necessary to shift the sleeve to different positions to more or less align the sleeve openings with the housing openings. Conditions being substantially equal, it is apparent that air will follow the path of least resistance. Accordingly, if the sleeve is moved to a position at which it overlaps mounting plate 31, air will be discharged in substantially equal volumes throughout the openings in its various faces. If, however, the parts are in the position shown, for example, in Fig. 5, air will flow through the lowermost set of louvers. Rearward movement of control 46 will induce air to flow through the uppermost set of louvers, and succeeding shifts will cause directional flows as desired. In certain instances it might be desired to increase the volume of air delivered by the heater. If this is desired, a structure such as is suggested in Figs. 6 and 7 may be employed. In these views the same reference-numerals have been employed as heretofore to indicate parts which are either identical or differ from each other merely in detail. However, it will be observed that the shroud plate indicated at 48 is formed with a materially larger opening. Also, the secondary casing 49 corresponding to casing 20 is located adjacent the motor mounting plate 31 rather than adjacent plate 14. Additionally, the blower-wheel 50 may conveniently be of slightly less diameter than the wheel indicated at 40—43. However, secured to the same hub which supports this wheel, or, in fact, forming a part of the wheel, is a fan 51 which lies adjacent the forward end of the wheel. Moreover, the secondary casing 49 may have welded to it a deflector or baffle plate in the form of a ring 52, curved in section, and of a diameter such that it extends in line with and beyond the bodies of blades 51.

As is well appreciated, the inner portions of fan blades are relatively inefficient; the maximum volume of air driven by the fan being impelled by zones of the blades situated adjacent the tips of the latter. On the other hand, a blower-wheel is relatively efficient. Thus, in this form of construction, those portions of the fan which would not be contributing to any material extent to the flow of air are eliminated and instead there is presented a passage through which air may flow to be impelled by the wheel. In common with the previously described construction, a portion of the air may be diverted outwardly to pass through the openings in housing 19, while the remainder of the air distributed by the wheel is discharged into and through the secondary casing. However, incident to the provision of the fan blades a greatly augmented volume of air will be drawn through the core and the opening in the shroud plate and be directed into the housing to pass through the openings of the latter. This flow will be particularly efficient if a baffle plate or deflector such as 52 is employed, and it is to be appreciated that such a structure is preferably employed.

While the present invention has been described particularly in connection with a heater for which use it is primarily intended, it will be understood that portions or all of the presently suggested structures might be advantageously utilized in connection with heat exchange in general. Moreover, numerous changes in construction and rearrangements of the parts might be resorted to without departing from the spirit of the invention as defined by the claims.

Having described my invention, what I claim as new and desire to secure by Letters Patent is:

1. An apparatus of the character described including a heat transfer core, an air impeller arranged beyond said core to receive air flowing therefrom and to distribute the same radially, means for driving said impeller, a housing enclosing said impeller and providing a passage for the flow of air therefrom, a casing also disposed adjacent said impeller and providing a passage for the flow of air distinct from said first named passage, and secondary impelling means associated with said impeller for accelerating the flow of air through at least one of said passages.

2. An apparatus of the character described including a heat transfer core, an air impeller arranged beyond said core to receive air flowing therefrom and to distribute the same radially, means for driving said impeller, a housing enclosing said impeller and providing a passage for the flow of air therefrom, a casing also disposed adjacent said impeller and providing a passage for the flow of air distinct from said first named passage, and a further impelling means secured to rotate with said first named impeller for increasing the volume of air distributed through one of said passages.

3. An apparatus of the character described including in combination a core, air impelling means positioned adjacent said core, a motor connected to said means to rotate the same to draw air through said core and to distribute the same radially, and means for deflecting the radially distributed air forwardly toward said core and outwardly beyond the edges of the same.

4. An apparatus of the character described including in combination a core, air impelling means positioned adjacent said core, a motor connected to said means to rotate the same to draw air through said core and to distribute the same radially, means for deflecting a portion of the radially distributed air forwardly toward said core and outwardly beyond the edges of the same, and means enclosing a portion of said impelling means and providing a passage for the tangential distribution of a column of air.

5. An apparatus of the character described including in combination a core, a motor disposed to the rear of the same, a shaft extending from said motor, a blower wheel secured to said shaft and disposed to the rear of said core to suck air therethrough, a fan secured to said wheel for also drawing air through said core, and distributing the same rearwardly, means for deflecting said rearwardly distributed air outwardly and forwardly beyond the edges of said core, and a casing encircling said blower wheel to receive air radially distributed thereby and in turn to distribute the same in the form of a column extending tangentially from said wheel.

6. An apparatus of the character described including in combination a core, a motor disposed to the rear of the same, a shaft extending from said motor, a blower wheel secured to said shaft and concentrically disposed with respect to said motor, a fan associated with said wheel to rotate therewith, a casing extending around said wheel and to receive air drawn through said core and radially distributed by said wheel, said casing being formed with an outlet through which the air flowing therethrough is distributed in the form of a column, and a deflector ring disposed to the rear of said fan to receive air discharged thereby.

7. An apparatus of the character described including in combination a core, a motor disposed to the rear of the same, a shaft extending from said motor, a blower wheel secured to said shaft and concentrically disposed with respect to said motor, a fan associated with said wheel to rotate therewith, a casing extending around said wheel and to receive air drawn through said core and radially distributed by said wheel, said casing being formed with an outlet through which the air flowing therethrough is distributed in the form of a column, and a deflector ring disposed to the rear of said fan to receive air discharged thereby, said ring being secured to said casing and being curved in section whereby the air impelled by said fan is distributed forwardly and outwardly beyond the edges of said core.

8. An apparatus of the character described, including in combination a core, a motor shaft disposed to the rear of the same, a blower wheel secured to said shaft and in line with said core, a fan associated with said wheel to rotate therewith, said wheel and fan both acting to draw air through said core and rearwardly thereof, and a casing extending around said wheel to receive air radially distributed thereby and to, in turn, distribute such air in the form of a column.

9. An apparatus of the character described, including, in combination, a core, a motor shaft disposed to the rear of the same, a shroud plate also disposed to the rear of said core, a blower wheel secured to said shaft and to the rear of said plate, a fan associated with said wheel to rotate therewith, said fan extending within the opening of said plate and acting in conjunction with said wheel to draw air through said core and through said plate opening, and a casing extending around said wheel to receive air radially distributed thereby and to in turn distribute such air in the form of a tangentially extending column.

10. An apparatus of the character described including in combination a core, a blower wheel positioned adjacent said core, a motor connected to said wheel to rotate the same, to draw air through said core and to distribute the same radially and means for deflecting the radially distributed air forwardly towards said core and outwardly beyond the edges of the same.

11. An apparatus of the character described including in combination a core, a blower wheel positioned adjacent said core, a motor connected to said wheel to rotate the same, to draw air through said core and to distribute the same radially, means for deflecting a portion of the radially distributed air forwardly towards said core and outwardly beyond the edges of the same and means enclosing a portion of said wheel and providing a passage for the tangential distribution of a column of air.

12. An air conditioning device comprising a casing having air inlet and outlet openings, a radiator supported in the casing for conditioning the air as it enters the casing at the inlet opening, an air propelling unit within the casing comprising a motor having a shaft, a propeller type fan on one end of said shaft for expelling air through the outlet opening, an impeller also mounted on said shaft, and in advance of the motor and to the rear of said fan, a housing surrounding the impeller, said housing having an air intake opening receiving conditioned air from the interior of the casing and an outlet conduit extending beyond a wall of the casing, and means for supporting said unit within the casing.

13. A unit heater comprising a casing having air inlet and outlet openings and including a radiator for conditioning air as it enters at the inlet opening, an air propelling unit within the casing comprising a motor having a shaft, a propeller type fan on one end of said shaft for expelling air through the outlet opening, an impeller also mounted on said shaft in advance of the motor and to the rear of said fan, a housing surrounding the impeller, said housing having an air intake opening receiving conditioned air from the interior of the casing and an outlet conduit extending beyond the wall of the casing, and means for supporting said unit within the casing.

14. A unit heater comprising a casing having air inlet and outlet openings and including a radiator for conditioning air as it enters at the inlet opening, an air propelling unit within the casing comprising a motor having a shaft, a propeller type fan on one end of said shaft arranged to draw air through said radiator and expell said air through the outlet opening, an impeller also mounted on said shaft and in advance of the motor and to the rear of said fan, said impeller being arranged to draw air through said radiator, a housing surrounding the impeller, said housing having an air intake opening receiving conditioned air from the interior of the casing and an outlet conduit extending beyond the wall of the casing, and means for supporting said unit within said casing.

15. A unit heater comprising casing members defining the confines of said heater and forming air inlet and outlet openings, said casing members including a radiator for conditioning air as it enters at the inlet opening, an air propelling unit within said confines comprising a motor having a shaft, a propeller type fan on one end of said shaft arranged to draw air through said radiator and expel air through the outlet opening, an impeller also mounted on said shaft and in advance of the motor and to the rear of said fan, a housing surrounding the impeller, said housing having an air intake opening receiving conditioned air from the interior of the casing and an outlet conduit extending beyond the wall of the casing, and means for supporting said unit within the casing.

16. A unit heater comprising a heat transfer core, an air impeller arranged beyond said core to draw air through said core and to distribute the same radially, a motor having a shaft, said impeller being mounted on said shaft in advance of said motor, a housing enclosing said impeller and providing a passage for the flow of air therefrom, a casing providing a passage for the flow of air distinct from said first-named passage, and a propeller type fan mounted on said shaft in advance of said impeller for drawing air through said core and for discharging the same through said last-named passage.

CARL E. MEYERHOEFER.